(12) United States Patent
Saeed et al.

(10) Patent No.: US 10,375,217 B2
(45) Date of Patent: Aug. 6, 2019

(54) PLASTIC METAL HYBRID HOUSE OF A SALE-INTEGRATED TRANSACTION MOBILE DEVICE

(71) Applicants: Faisal Saeed, Santa Clara, CA (US); Zia Hasnain, Santa Clara, CA (US); Asif Rao, Santa Clara, CA (US); Abhinav Subramani, San Jose, CA (US); Jaykishan Dakshesh Choksi, San Jose, CA (US)

(72) Inventors: Faisal Saeed, Santa Clara, CA (US); Zia Hasnain, Santa Clara, CA (US); Asif Rao, Santa Clara, CA (US); Abhinav Subramani, San Jose, CA (US); Jaykishan Dakshesh Choksi, San Jose, CA (US)

( * ) Notice: Subject to any disclaimer, the term of this patent is extended or adjusted under 35 U.S.C. 154(b) by 0 days.

(21) Appl. No.: 15/721,923

(22) Filed: Oct. 1, 2017

(65) Prior Publication Data

US 2018/0278730 A1     Sep. 27, 2018

Related U.S. Application Data

(63) Continuation-in-part of application No. 14/850,943, filed on Sep. 10, 2015.

(60) Provisional application No. 62/438,468, filed on Dec. 23, 2016.

(51) Int. Cl.
| | |
|---|---|
| *H04M 1/02* | (2006.01) |
| *G06Q 20/32* | (2012.01) |
| *G06Q 20/20* | (2012.01) |
| *H04B 5/00* | (2006.01) |

(52) U.S. Cl.
CPC ........ *H04M 1/0202* (2013.01); *G06Q 20/204* (2013.01); *G06Q 20/322* (2013.01); *G06Q 20/3224* (2013.01); *G06Q 20/3278* (2013.01); *H04B 5/0062* (2013.01); *H04M 2250/14* (2013.01)

(58) Field of Classification Search
CPC ........ G06Q 20/20; G06F 17/00; G06K 19/00; G06K 19/06
USPC .................. 235/383, 375, 487, 380, 492
See application file for complete search history.

(56) References Cited

U.S. PATENT DOCUMENTS

| | | | | |
|---|---|---|---|---|
| 5,818,915 | A  * | 10/1998 | Hayes, Jr. ........... | H04M 1/0202 455/405 |
| RE43,954 | E  * | 2/2013 | Shtesl .................. | G06Q 20/341 235/449 |
| 2014/0162598 | A1* | 6/2014 | Villa-Real ............... | H04M 1/66 455/411 |
| 2014/0297539 | A1* | 10/2014 | Swamy ................ | G06K 7/0004 705/71 |

* cited by examiner

*Primary Examiner* — Edwyn Labaze

(57) ABSTRACT

In one aspect, a sale-integrated transaction mobile device includes the set of components of a mobile device system. The sale-integrated transaction mobile device includes a set of components of a payment device system that is a separate module such as a payment module. The sale-integrated transaction mobile device includes a plastic housing upper portion of the mobile device system. The sale-integrated transaction mobile device includes a metal housing bottom portion of the mobile device. The plastic housing upper portion of the mobile device system is connected with the bottom metal housing portion to house the components of the mobile device system.

16 Claims, 20 Drawing Sheets

US 10,375,217 B2

PLASTIC METAL HYBRID HOUSE OF A SALE-INTEGRATED TRANSACTION MOBILE DEVICE

CROSS-REFERENCE TO RELATED APPLICATIONS

This application claims priority to U.S. application Ser. No. 14/850,943, titled Smart Integrated Point-of-sale System and filed on Sep. 10, 2015. This utility application is hereby incorporated by reference in its entirety.

This application claims priority to U.S. Application No. 62/438,468, titled POINT OF SALE MOBILE DEVICE METHODS AND SYSTEMS and filed on 23 Dec. 2016. This provisional application is hereby incorporated by reference in its entirety.

BACKGROUND

1. Field

This description relates to the field of mobile devices and more specifically to plastic metal hybrid house of a sale-integrated transaction mobile device.

2. Related Art

Currently in the market there are only products which incorporate payment methods (e.g. MSR, EMV, NFC, etc.) in a jacket/sleeve designed to fit consumer phones such as iPhone. Similar sleeves are also available for scanner. Other companies have a scanner built with a cellular phone. However, these are thick and bulky devices. None of these products have, a thickness of less than fourteen millimeters (14 mm). Additionally, Current PoS systems on the market are bulky, take up large amounts of valuable countertop space, utilize outdated technology, consist of multiple separate attachments, and do not offer a modern look and feel. Moreover, current systems that have some modern look are not capable of accepting all forms of payments, and they are not able to provide valuable user experiences for customers, shop owners, and businesses. Therefore, there is a need to provide a complete end-to-end business management solution that comprises different hardware and software components to provide an integrated payment and customer experience solution.

BRIEF SUMMARY OF THE INVENTION

In one aspect, a sale-integrated transaction mobile device includes the set of components of a mobile device system. The sale-integrated transaction mobile device includes a set of components of a payment device system that is a separate module such as a payment module. The sale-integrated transaction mobile device includes a plastic housing upper portion of the mobile device system. The sale-integrated transaction mobile device includes a metal housing bottom portion of the mobile device system. The plastic housing upper portion of the mobile device system is connected with the bottom metal housing portion to house the components of the mobile device system.

In one example, the set of components of the mobile device system comprises a mobile-device processor, a secure payment processor, a memory, an EMV (Europay, MasterCard, and Visa) card reader system, a Magnetic stripe reader (MSR).

BRIEF DESCRIPTION OF THE DRAWINGS

The present application can be best understood by reference to the following description taken in conjunction with the accompanying figures, in which like parts may be referred to by like numerals.

Figure 1:
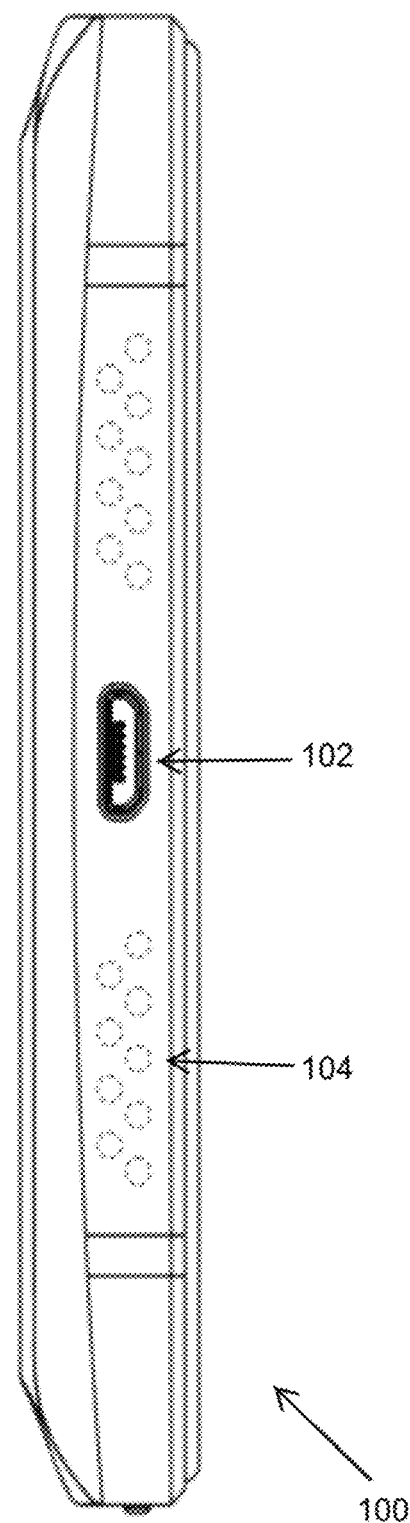
FIG. 1 is a perspective bottom view of a point-of-sale integrated transaction mobile device, according to some embodiments.

The Figures described above are a representative set, and are not an exhaustive with respect to embodying the invention.

DETAILED DESCRIPTION

Disclosed are a system, method, and article of manufacture for a plastic metal hybrid house of a sale-integrated transaction mobile device. The following description is presented to enable a person of ordinary skill in the art to make and use the various embodiments. Descriptions of specific devices, techniques and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Antenna Break can be as follows. For a piece of metal radiate as an antenna, its length can be tuned for the desired frequency. Accordingly, a metal frame can be broken into multiple parts and each part can be made to radiate as an antenna. The broken section(s) of the metal frame can be the Antenna Breaks.

EMV is a technical standard for smart payment cards and for payment terminals and automated teller machines that can accept them.

Magnetic stripe reader (MSR) can be a device used to read magnetic stripe cards such as credit cards.

Mobile device can be a computing device has operating system (OS) that can run various types of application software. A mobile device can be equipped with Wi-Fi, Bluetooth, NFC and GPS capabilities that can allow connections to the Internet and other devices, such as an automobile or can be used t provide location-based services. A camera or media player feature for video or music flies can also be typically found on these devices along with a stable battery power source such as a lithium battery. A mobile device can also contain sensors like accelerometers, compasses, magnetometers, or gyroscopes, allowing detection of orientation and motion.

Near Field Communication (NFC) is a short-range wireless connectivity, standard (e.g. Ecma-340, ISO/IEC 18092) that uses magnetic field induction to enable communication between devices when they're touched together, or brought within a few centimeters of each other.

Personal identification number (PIN) is a numeric password used to authenticate a user to a system. PINs may be used with banking systems to authenticate the identity of the cardholder.

Pogo pin can be a device used in electronics to establish a connection between two printed circuit boards. In some examples, a pogo pin takes the form of a slender cylinder containing two sharp, spring-loaded pins. Pressed between two electronic circuits, the sharp points at each and of the pogo pin make secure contacts with the two circuits and thereby connect them together.

Point-of-sale (PoS) can be the time and place where a retail transaction is completed. At the PoS, the merchant can calculate the amount owed by the customer and indicate the amount, and may prepare an invoice for the customer, and indicate the options for the customer to make payment.

Radio-frequency identification (RFID) can use electromagnetic fields to automatically identify and track tags attached to objects. The tags can contain electronically stored information. Passive tags collect energy from a nearby RFID reader's interrogating radio waves. Active tags have a local power source such as a battery and may operate at thousands of meters from the RFID reader.

Systems Overview

Embodiments of the present disclosure are directed to an all-in-one integrated PoS integrated transaction mobile device, related merchant services, as well as, other methods of use of said device. Generally, PoS integrated transaction mobile device is an electronic mobile device that can be connected to other devices or networks using various protocols such as Bluetooth, NFC, Wi-Fi, 2G/3G/4G etc.

In some embodiments, PoS integrated transaction mobile device provides an interface to a merchant services backend, a backend system that serves a request by applying pre-defined business logic, a database system to store, retrieve, update, delete transaction information, a data warehouse to manage historic data derived from transaction information and other data management sources, payment backend, and a management console to provide visibility to management to monitor all activities, generate reports, and allow management to manual interact with the all-in-one smart integrated point-of-sale system to update and modify information based on business intelligence and data mining.

PoS integrated transaction mobile device 100 can implement payment methods in a secure manner that passes stringent certification requirements. For example, PoS integrated transaction mobile device 100 can include physical/mechanical protections such as, inter alia: tamper switches, security meshes, etc. PoS integrated transaction mobile device 100 can include various logical protections such as, inter alia: chip level encryption, encrypted card data from all payment methods and/or encrypted communication to the back end. These features are incorporated in cellular phone form factor in PoS integrated transaction mobile device 100. PoS integrated transaction mobile device 100 design has all these protections to be incorporated into the form factor of a cellular phone and provides sleek designs around 14 mm or less in thickness. These and other advantages of the present technology are described herein with reference to the collective drawings.

FIGS. 1-6 illustrate various perspective views of a PoS integrated transaction mobile device 100. PoS integrated transaction mobile device 100 can include one or more processors (e.g., INTEL ATOM® processor or any other tablet processor), a secure payment processor, and a main memory and static memory (collectively "memory"), which communicate with each other and any additional components via a bus.

PoS integrated transaction mobile device 100 may further include display(s), such as merchant display, at least one customer display. PoS integrated transaction mobile device 100 may also include an alpha-numeric or numeric input device(s) (e.g., a keyboard, keypad, touchscreen, numeric keypad), a weighing scale, biometric sensor(s) (e.g., fingerprint, voice recognition, face recognition, etc.), a scanner or barcode reader, at least one camera, and be communicatively coupled with a printer. PoS integrated transaction mobile device 100 can be connected to other devices or networks via Ethernet, Bluetooth Low Energy (BLE), Wi-Fi, Cellular data, such as 2G/3G/4G, and Bluetooth. Additionally, PoS integrated transaction mobile device 100 may include a signature display, a keypad, a magnetic stripe reader (MSR), an EMV (Europay, MasterCard, and Visa) card reader, NFC (Near field communication) reader, a drive unit (also, referred to as disk drive unit), audio/microphone, GPS/gyroscope, I/O (Input/Output) Ports Hub, and ports. PoS integrated transaction mobile device 100 may further include a power integrated circuit (IC) that can manage the power supply to various components within PoS integrated transaction mobile device 100 and a data encryption module (not shown) to encrypt data.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection an Ethernet connection, an ISDN (Integrated Services Digital Network) line, a dial-up port such as a V0.90, V0.34 or V0.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, cellular data technologies like LTE, 2G/3G/4G, etc., or an IEEE 802.11-based radio frequency network.

One skilled in the art will recognize that the Internet service may be configured to provide Internet access to one or more computing devices that are coupled to the Internet service, and that the computing devices include one or more processors, buses, memory devices, display devices, input/output devices, and the like. Furthermore, those skilled in the art may appreciate that the Internet service may be coupled to one or more databases, repositories, servers, Customer Relationship Management (CRM) systems, Enterprise Resource Planning (ERP) systems, and the like, which may be utilized in order to implement any of the embodiments of the disclosure as described herein.

The present technology may be implemented as a web service in a secure cloud-based distributed scalable computing environment. A cloud-based computing environment is a resource that typically combines the computational power of a large grouping of processors and/or that combines the storage capacity of a large grouping of computer memories or storage devices sometimes distributed in different continents. For example, systems that provide a cloud resource may be utilized exclusively by their owners; or such systems may be accessible to outside users who deploy applications within the computing infrastructure to obtain the benefit of large computational or storage resources and may provide outside users access to larger audience.

The cloud back-end to support a PoS integrated transaction mobile device 100 may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

PoS integrated transaction mobile device 100 can mechanically isolate the payment and scanner functionalities into a separate payment module. The payment module incorporates the security features of PoS integrated transaction mobile device. The payment module design enables a USB connector and/or USB connection through pogo pins. This reduces the size and thickness of the connector.

More specifically, FIG. 1 is a perspective bottom view of PoS integrated transaction mobile device 100, according to some embodiments. PoS integrated transaction mobile device 100 can include speakers 104 and port 102. Port 102 can be a computer bus and/or power connector.

Figure 2:
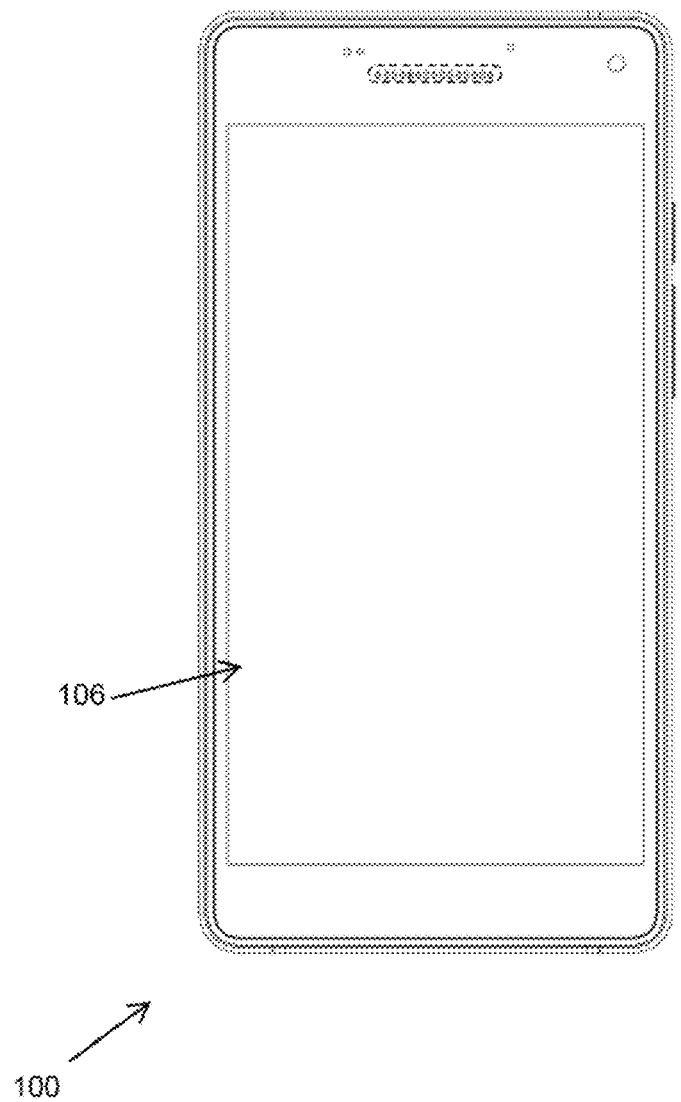
FIG. 2 is a perspective front view of a point-of-sale integrated transaction mobile device, according to some embodiments.

FIG. 2 is a perspective front view of PoS integrated transaction mobile device 100, according to some embodiments. PoS integrated transaction mobile device 100 can include touch-screen display 106. Touch-screen display 106 can be an input and output device normally layered on the top of an electronic visual display of an information processing system. A user can give input or control the information processing system through simple or multi-touch gestures by touching the screen with a special stylus and/or one or more fingers. Touch-screen display 106 can be used to access the functionalities of a mobile-device payment application. In this way, PoS integrated transaction mobile device 100 can used to manage payment services operated under financial regulation and performed from or via PoS integrated transaction mobile device 100.

Figure 3:
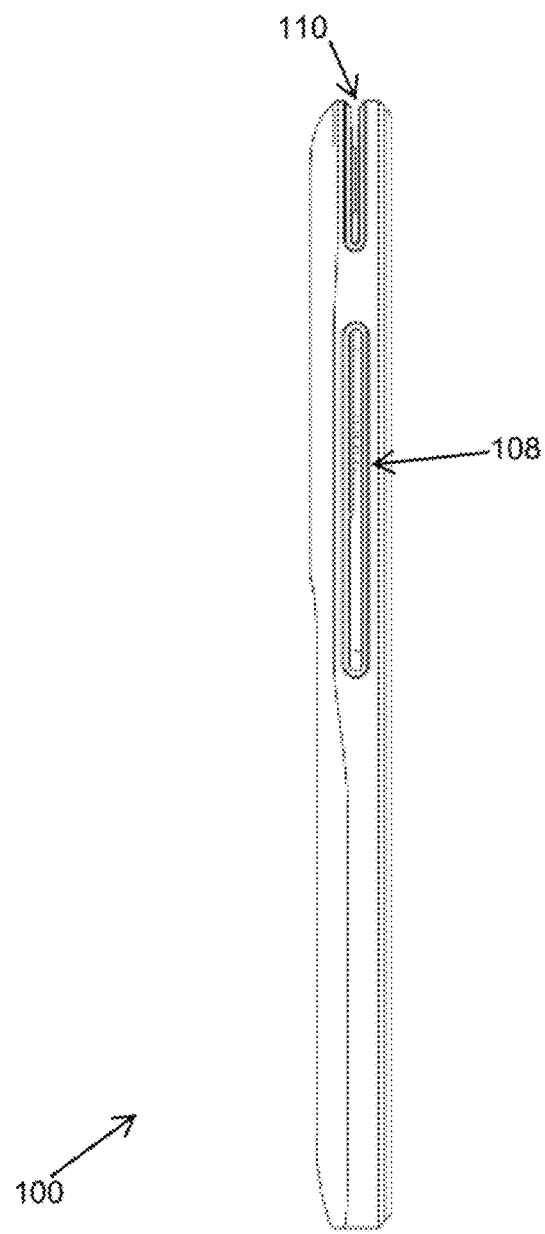
FIG. 3 is a perspective left-side view of a point-of-sale integrated transaction mobile device, according to some embodiments.

FIG. 3 is a perspective left-side view of PoS integrated transaction mobile device 100, according to some embodiments. PoS integrated tansaction mobile device 100 can include MSR slot 110 MSR slot 110 can include a magnetic card reader that is a component of a payment module. The dimensions of the slot can be slightly larger (e.g. one mm, 0.5 mm, etc.) than the thickness of a magnetic card (e.g. slightly greater than 0.76 mm as regulated by ISO/IEC 7810 or other international standards). PoS integrated transaction mobile device 100 can include EMV slot 108. EMV slot 108 can be slight larger than the portion of a credit and to be inserted in its chip reader portion (e.g. as defined by ISO/IEC 7810 or another international standard, etc.). Additional dimensions of various aspects of the payment module, MSR slot 110 and/or EMV slot 108 are provided infra according to some embodiments.

Figure 4:
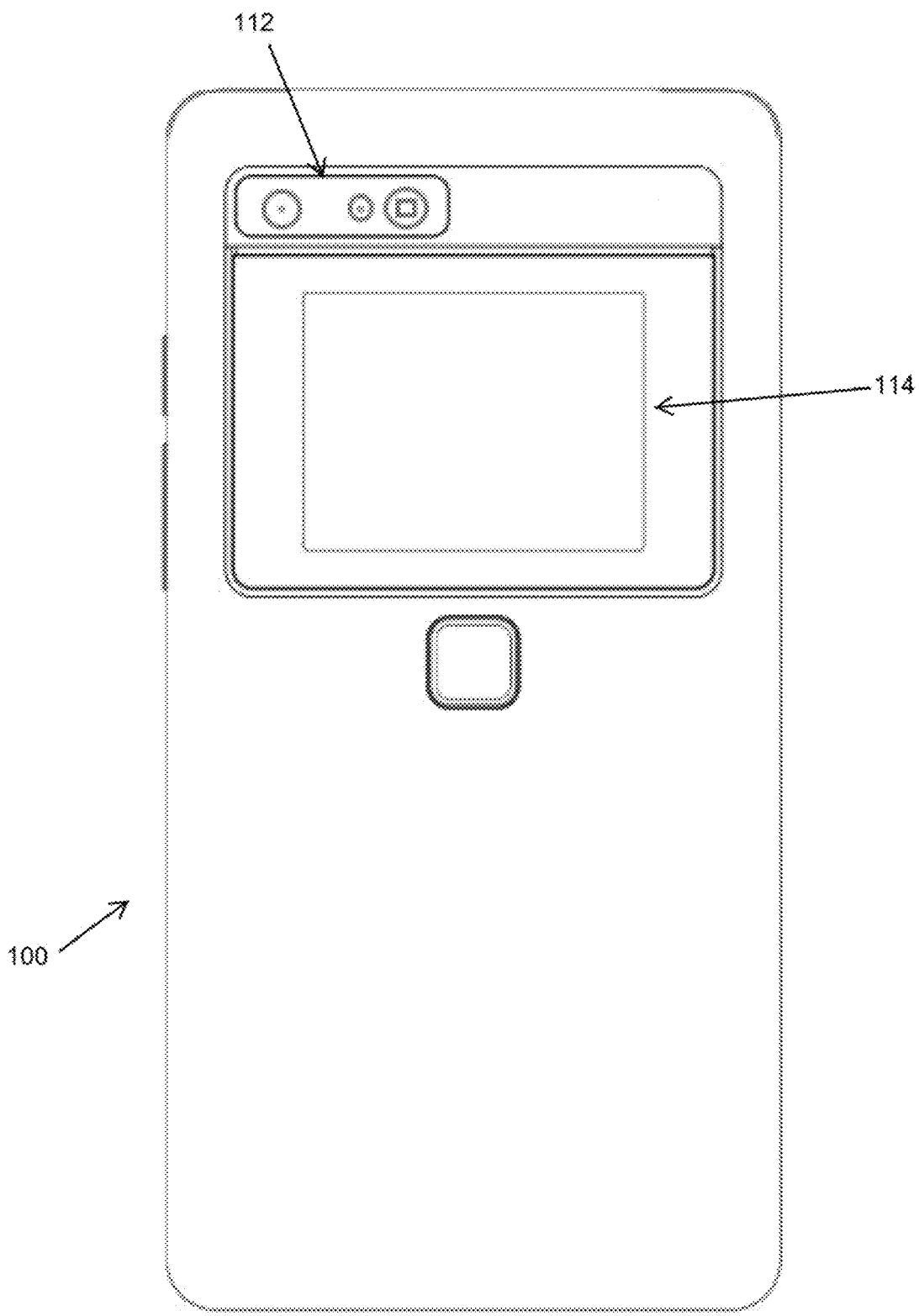
FIG. 4 is a perspective rear view of a point-of-sale integrated transaction mobile device, according to me embodiments.
Figure 5:
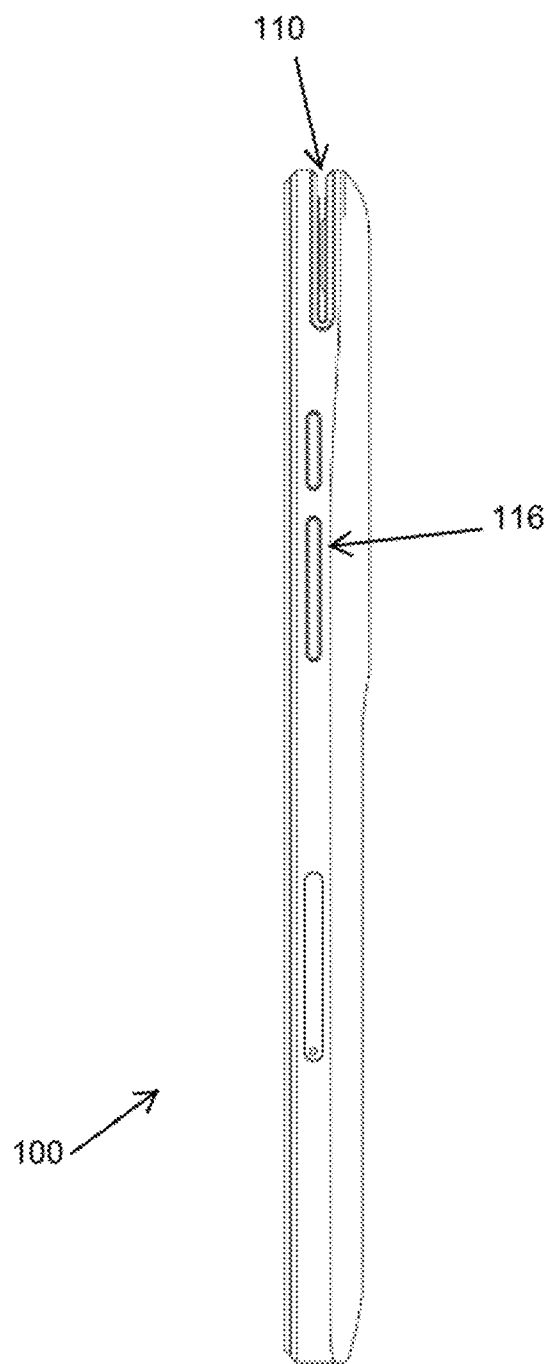
FIG. 5 is a perspective right-side view of a point-of-sale integrated transaction mobile device, according to some embodiments.
Figure 6:
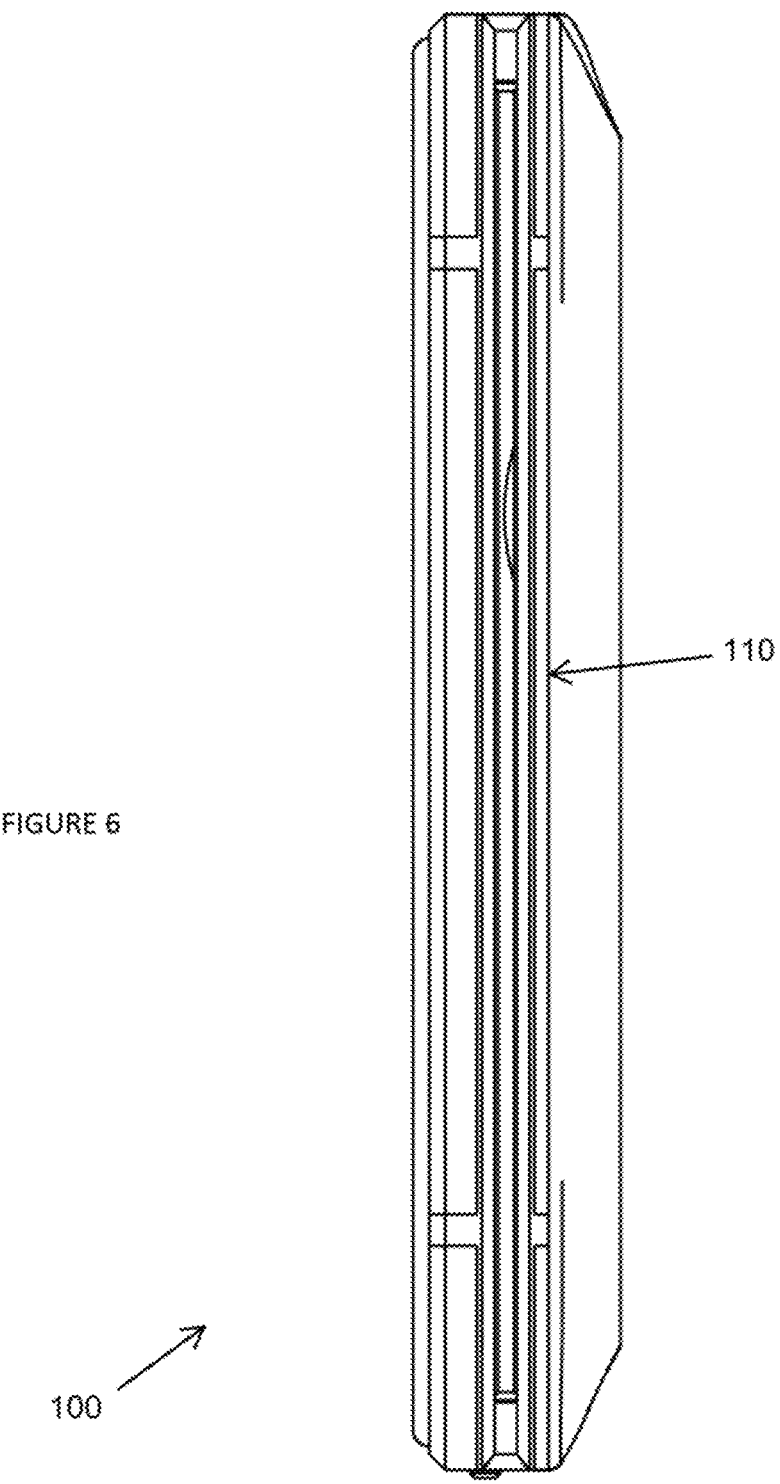
FIG. 6 is a perspective top view of a point-of-sale integrated transaction mobile device, according to some embodiments.

FIG. 4 is a perspective rear view of PoS integrated transaction mobile device 100, according to some embodiments. As show in FIG. 4, PoS integrated transaction mobile device 100 can include digital camera(s) and/or scanners 112, digital camera(s) and/or scanners 112 can be utilized in various merchant activities and/or obtain information related to mobile-device transactions. PoS integrated transaction mobile device 100 can include a display 114. Display 114 can be used to implement a secure touch input system for secure signature and pin entry FIG. 5 is a perspective right-side view of PoS integrated transaction mobile device 100, according to some embodiments. As shown in FIG. 5, PoS integrated transaction mobile device 100 can include various control buttons 116 (e.g. power buttons, volume control buttons, etc.). FIG. 6 is a perspective top view of PoS integrated transaction mobile device 100, according to some embodiments. It is noted that the dimensions of PoS integrated transaction mobile device 100 are varied as shown in FIGS. 1-6. For example, FIGS. 1 and 6 area a close-up view of PoS integrated transaction mobile device 100 in order to illustrate additional details of MCR 110.

Figure 7:
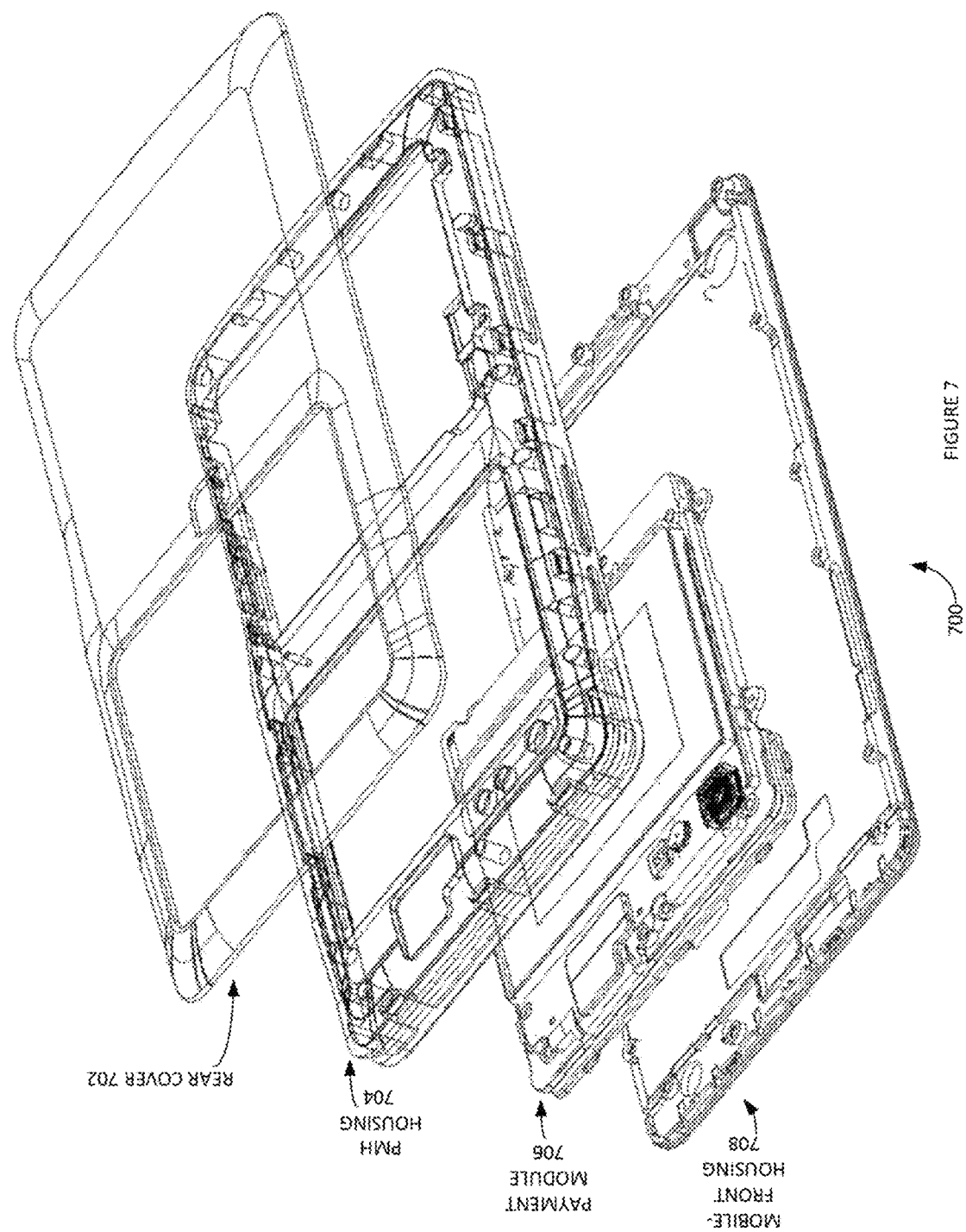
FIG. 7 illustrates a schematic illustration of an exploded view of component of a point-of-sale integrated transaction mobile device, according to some embodiments.

Referring now to FIG. 7, a schematic illustration of an exploded view of component of PoS integrated transaction mobile device 700, according to some embodiments. Components of PoS integrated transaction mobile device 700 can include a rear cover 702, Plastic-Metal Hybrid (PMH) housing 704, payment module 706 and mobile-front housing 708.

Rear cover 702 can encapsulate the exterior rear portion of mobile-device payment system 700. Rear cover 702 can coupled with PMH housing 704. PMH housing 704 is a plastic metal hybrid, to give a sturdiness to middle housing. PMH housing 704 can hold payment module 706

Payment module 706 can include various payment systems such as MSR, EMV, NFC etc. As shown, the components of these systems can be formatted to fit into mobile-device payment system 100 size factor. Various figures provided infra include additional information regarding payment module 706.

Mobile-front housing 708 can have high resolution display and capacitive touch, to provide sharp and crisp graphic contents and multipoint touch interface, and the mobile board. The present technology is described above with reference to exemplary embodiments. Therefore, other variations upon the exemplary embodiments are intended to be covered by the present technology.

Figure 8:
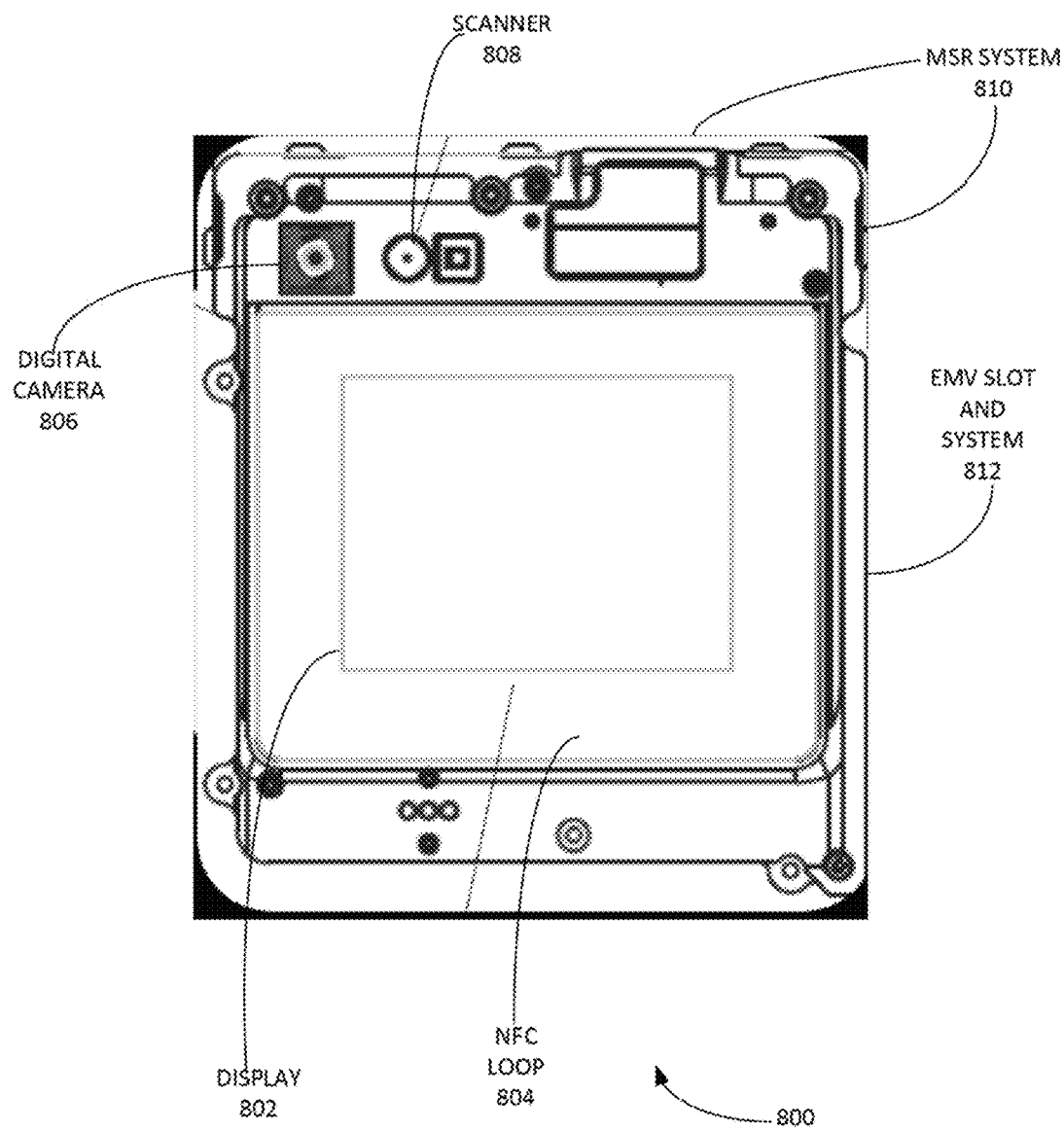
FIG. 8 illustrates an example payment module, according to some embodiments.

FIG. 8 illustrates an example payment module 800, according to some embodiments. Payment module contains a low power display 802. Display can include a secure touch input system. Secure touch input can be used for PIN entry and signature. NFC antenna loop 804 is just around the display 802. FIG. 8 illustrates an NFC antenna that can also be extended to a back cover to give more coverage to NFC. NFC is standard for two devices to communicate. NFC is used to make payment through mobile devices using Apple® pay, Samsung® pay, Android® pay, etc.

Scanner 808 and digital camera 806 can also be incorporated into payment module 800. Scanner 808 can be used for scanning items, such as product barcodes, boarding passes etc., directly into a basket. A dedicated commercial grade scanner imager to scan items quickly and accurately. MSR system 810 (e.g. includes MSR slot 110) is at the top payment module 800 above scanner 808 and digital camera 806 in the present perspective. EMV system 812 (e.g. includes EMV slot 108) is on the right-hand side of the payment module 808 in the present perspective.

Figure 9A:
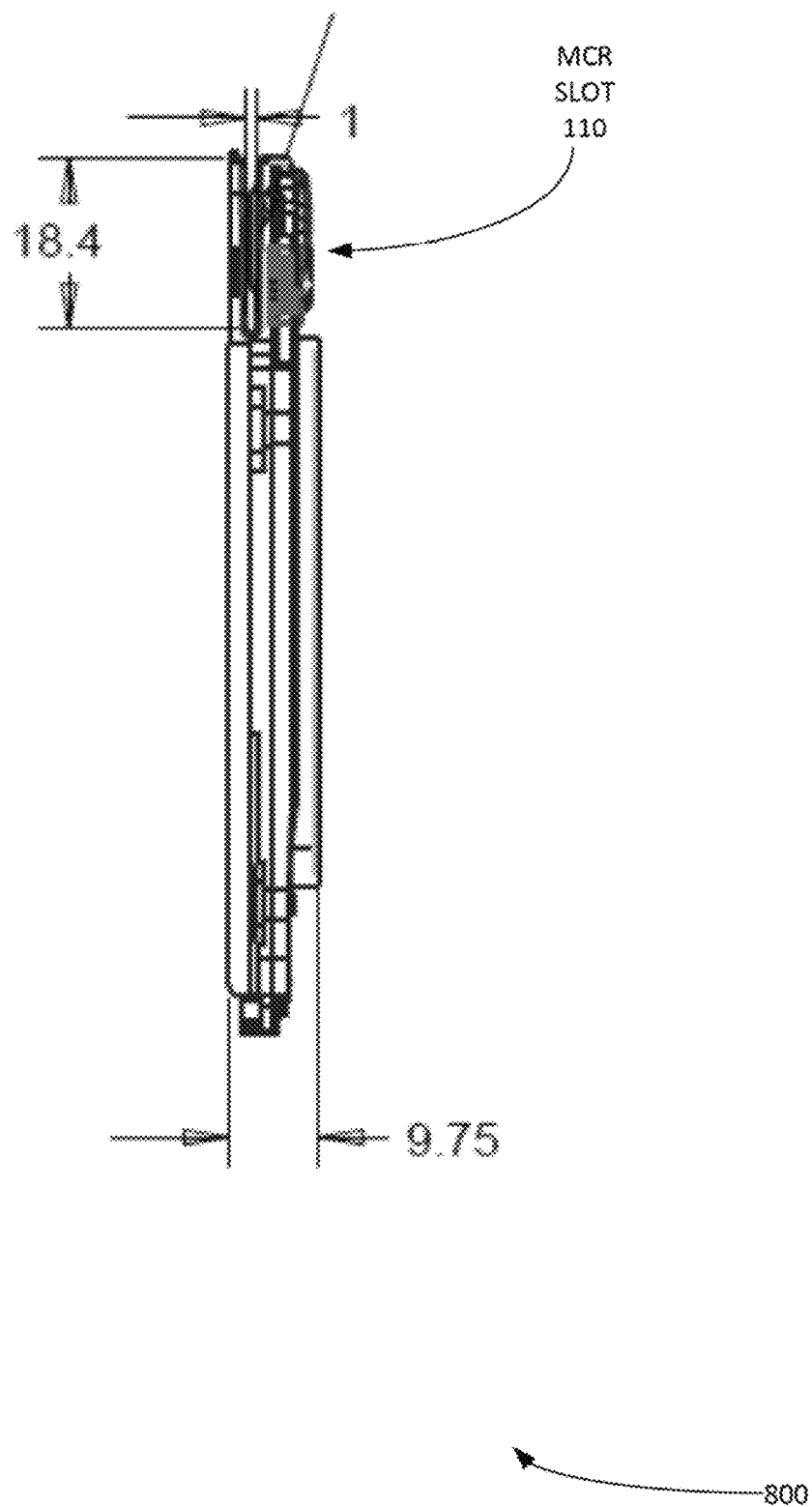
FIGS. 9A-C illustrates a perspective side view of payment module, according to some embodiments.
Figure 9B:
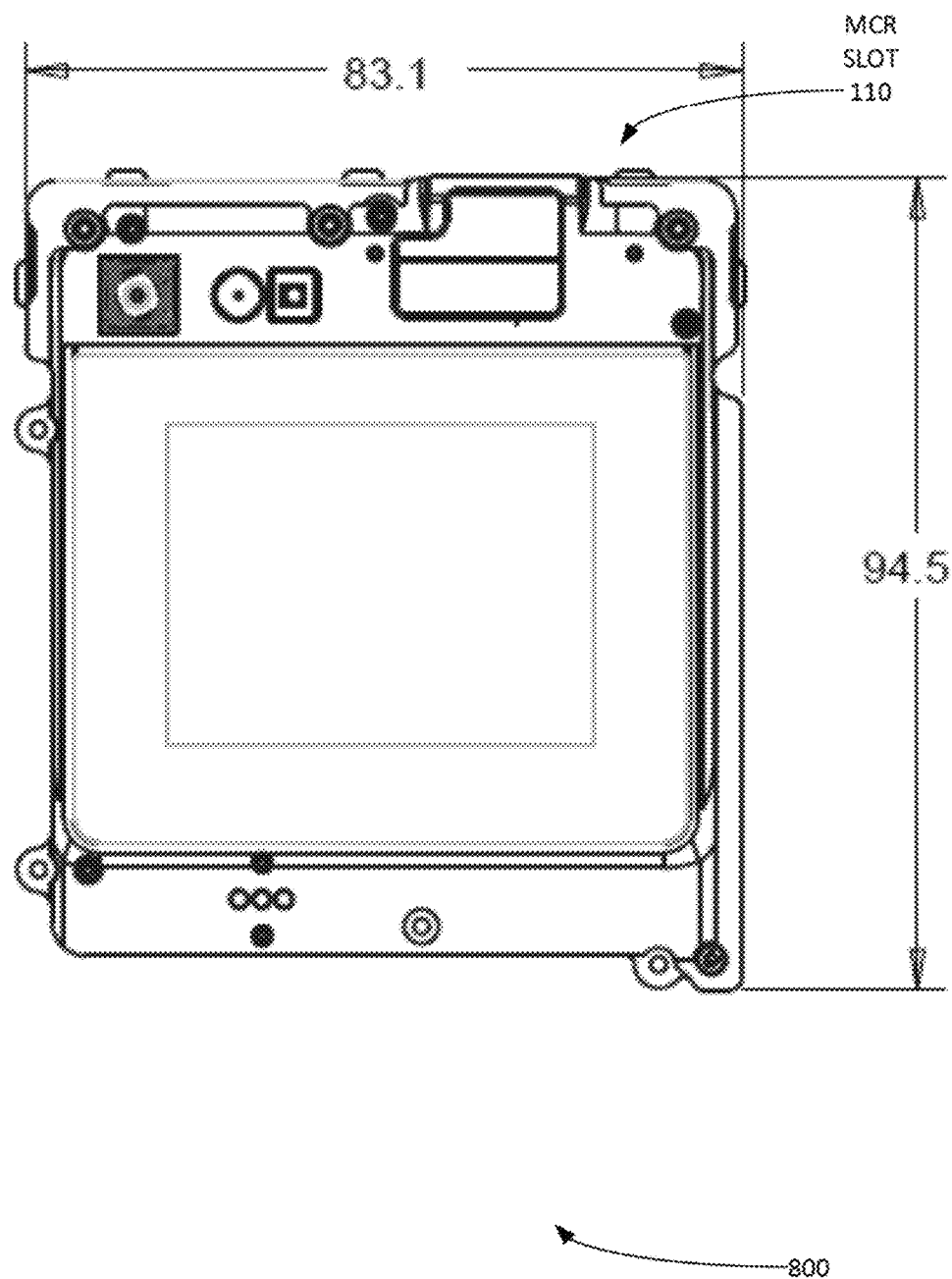
Figure 9C:
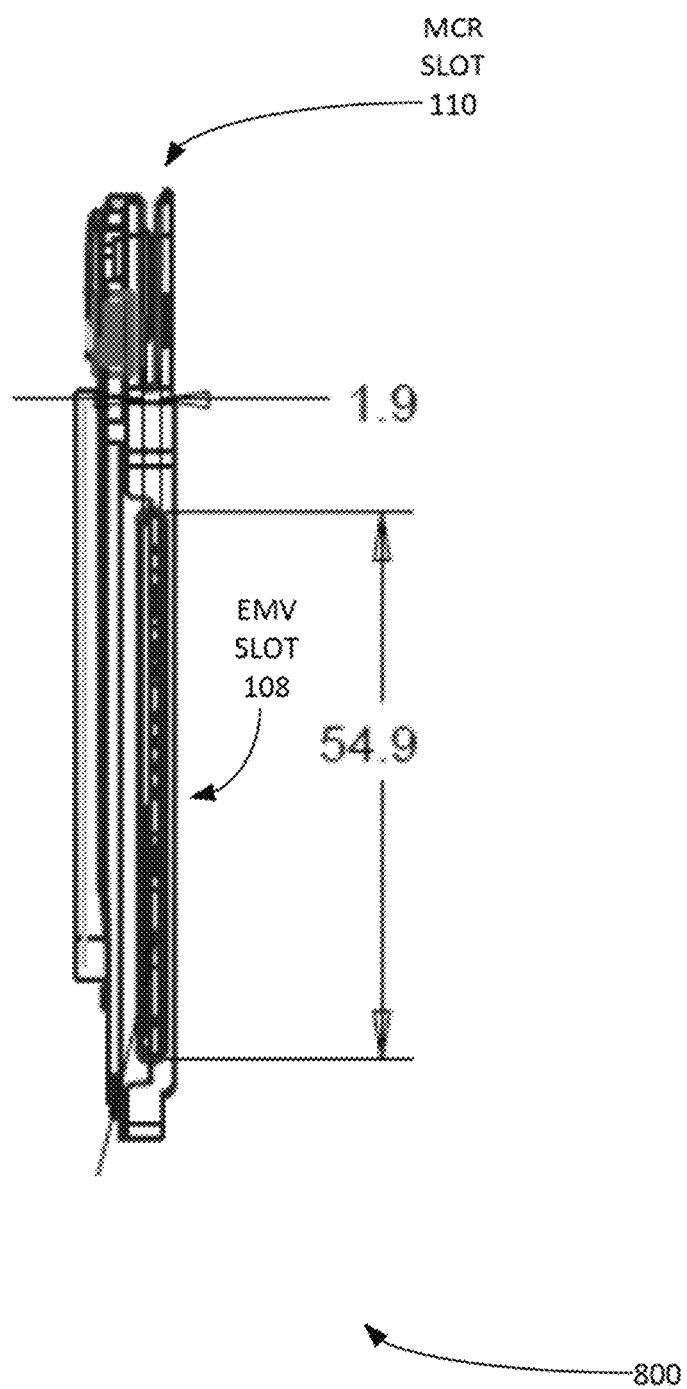

FIGS. 9A-C illustrates a perspective side view of payment module 800, according to some embodiments. FIGS. 9A-C illustrates example dimensions of payment module 800 as shown. These dimensions are provided by way of example and not of limitation. Dimensions are provided in millimeters (mm).

An example payment module is now described, according to some embodiments. Exploded view of payment module illustrates the stack up of the payment module. Starting from the top down, a first layer can be cover glass. The cover glass can have a glass film film (GFF) touch sensor on the back side. The GFF touch sensor can be driven by a secure touch IC which encrypts the touch data going to the payment processors. The display (e.g. display 106 discussed supra) can be directly laminated to glass. Under the cover glass and around the display can be the NFC Antenna loop. In some embodiments, the NFC antenna loop is mounted or sits on the back cover. The various parts/components can be glued to the front housing. The payment board can contain the EMV card reader on the bottom side. Next to EMV card reader can be a payment processor. The EMV card reader and payment processor can be secured by a tamper-proof security mesh. The tamper-proof security mesh must be removed to access the card reader or the payment process. If it is cut, lifted and/or ripped the lines in the the mesh break a circuit which joins to the payment process causing sensitive data to be erased immediately. On the top side of the board a second security mesh acts as a trigger when the housing is removed. There are features on underside of the front housing which press on domes in tamper-proof security mesh. When the housings are pried apart the domes are lift and break a circuit which also joins to the payment process and causes sensitive data to be erased. MSR head can be joined to the board which flexible connector which has similar security feature to EMV security mesh. The rear camera and the scanner are mounted on the rear housing with features which allow it to be connected to the mobile board.

When the payment module is assembled into a separate device, it has screws and tabs which allow it to be secured to the housing of the main device. There are also alignment features to ensure that the cosmetic parting line between the cover glass bezel and the main device are controlled tightly. Similar features are in place to align the MSR card slot and EMV card slot to the main device slots to ensure smooth travel of the card. The scanner and rear camera are also aligned with the main product openings. The net effect is a seamless transition and the appearance of one unified product for the customer.

The scanner and rear camera can be connected to mobile board through flexible circuit (e.g. flex, etc.). Normally a separate scanner board is used to run the scanner, therefore they are usually a sleeve in the market or are thick and bulky. In contrast, some embodiments can incorporate scanner board components into the mobile board which allows scanner to be run by the mobile board. This reduces thickness of the product significantly.

The payment board has either gold plated pucks or a USB male connector or pogo pins. The mobile board is fitted with corresponding features, using either pogo pins or a USB female connector or gold-plated pucks. The pogo pin design allows for a much smaller size and reduced thickness. There are features in the payment module to ensure proper alignment between the pogo pins and the puck.

Figure 10:
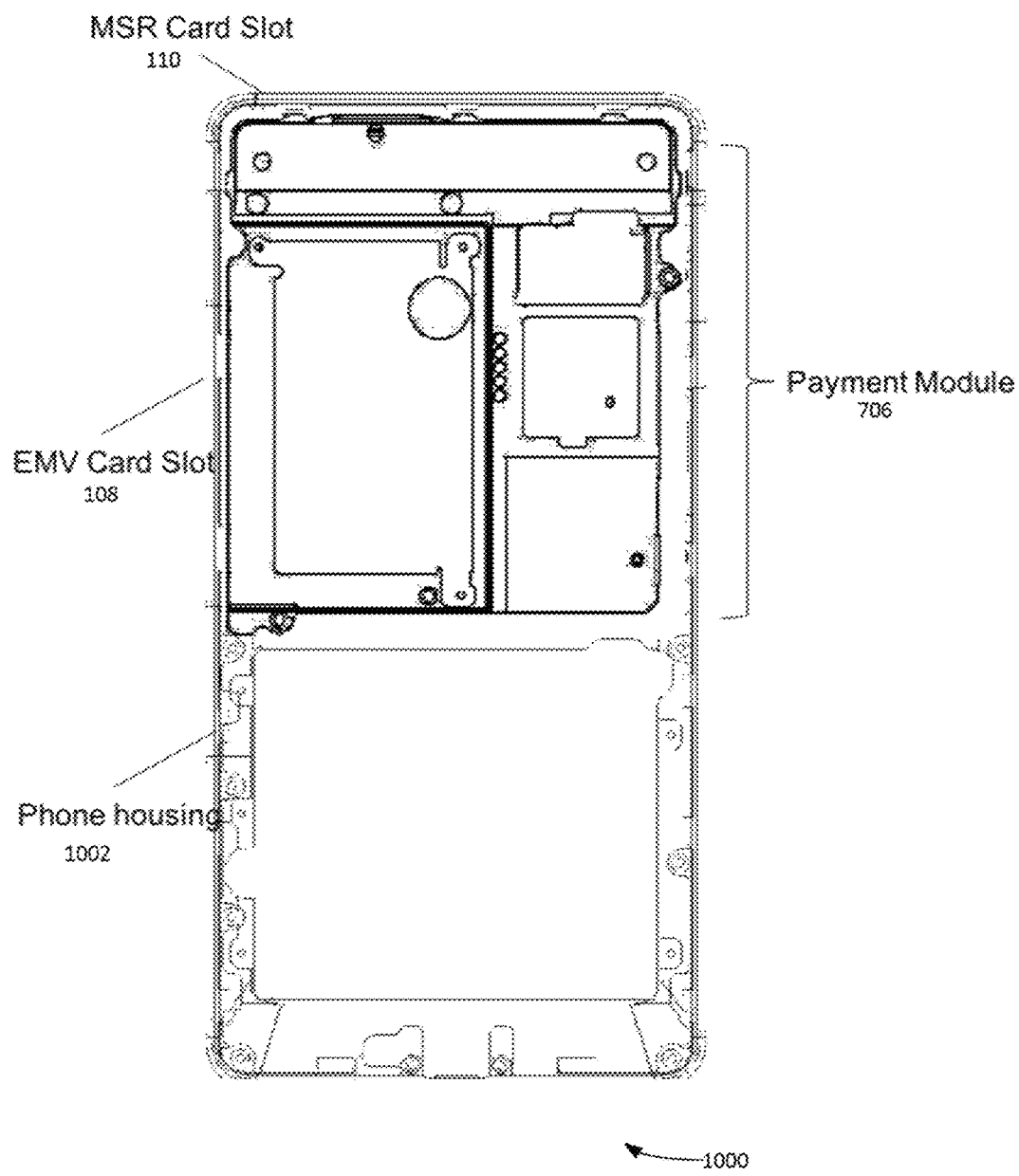
FIG. 10 illustrates an example view of payment module integrated into housing, according to some embodiments.

FIG. 10 illustrates another view of how payment module 706 can be integrated into a phone housing (e.g. a housing of sale integrated transaction mobile device 1000, etc.).

Figure 11:
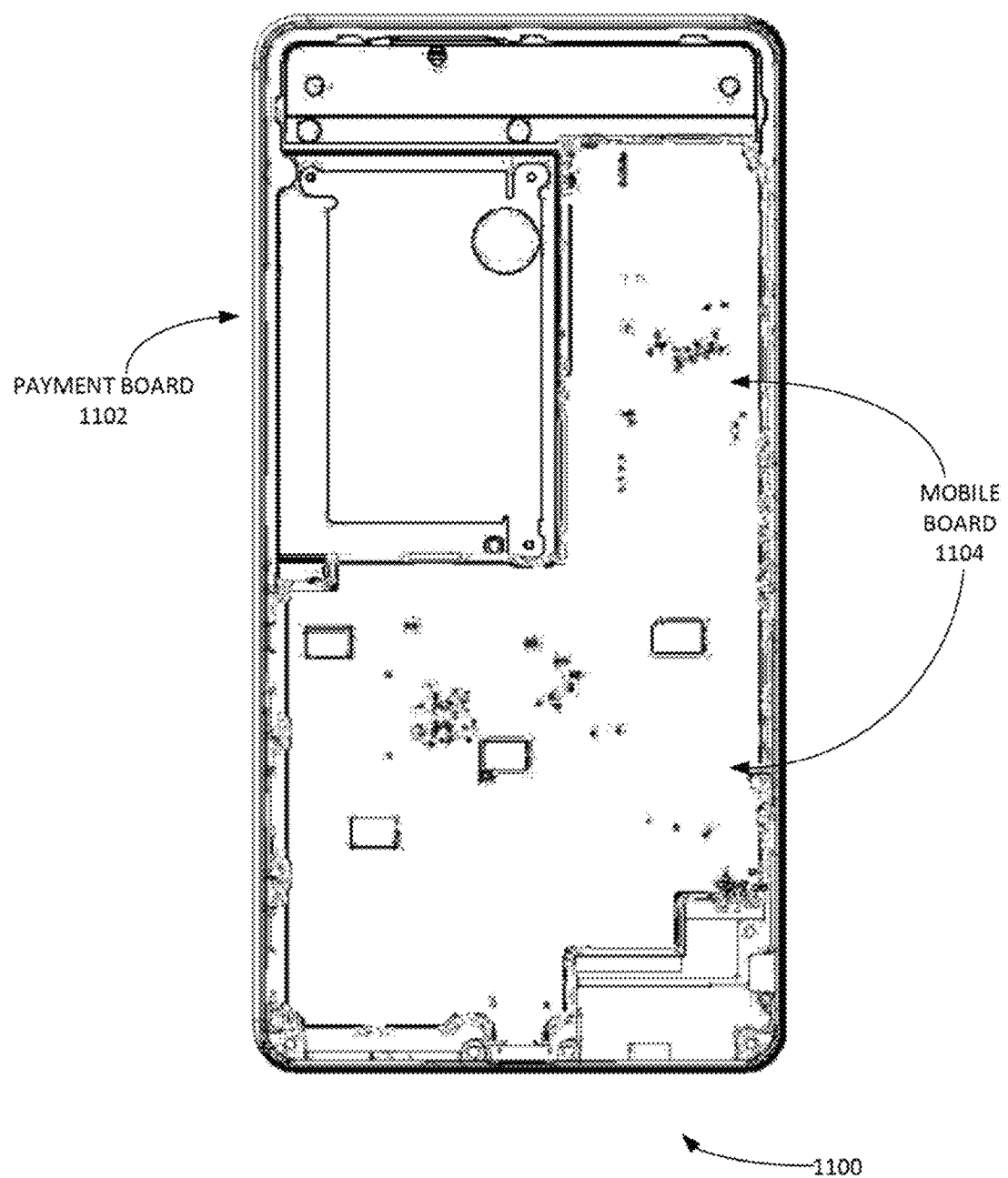
FIG. 11 illustrates the mobile PCB and the payment module in the PMH, according to some embodiments.

FIG. 11 illustrates another example view of a payment board 1102 integrated into a mobile board 1104 of a sale integrated transaction mobile device 1000, according to some embodiments. Payment board 1102 can be securely sit behind the Mobile board 1104. Payment boards are normally found outside the device and connected using USB or some other connector. Here payment board 1102 is uniquely fitted inside a mobile device form factor. Mobile board 1104 is placed in front of the payment board 1102 to provide complete smart phone functionality. Mobile board 1104 hosts all the POS applications, wireless network connectivity and all the features that are found in any typical smart phone in the market.

Figure 12:
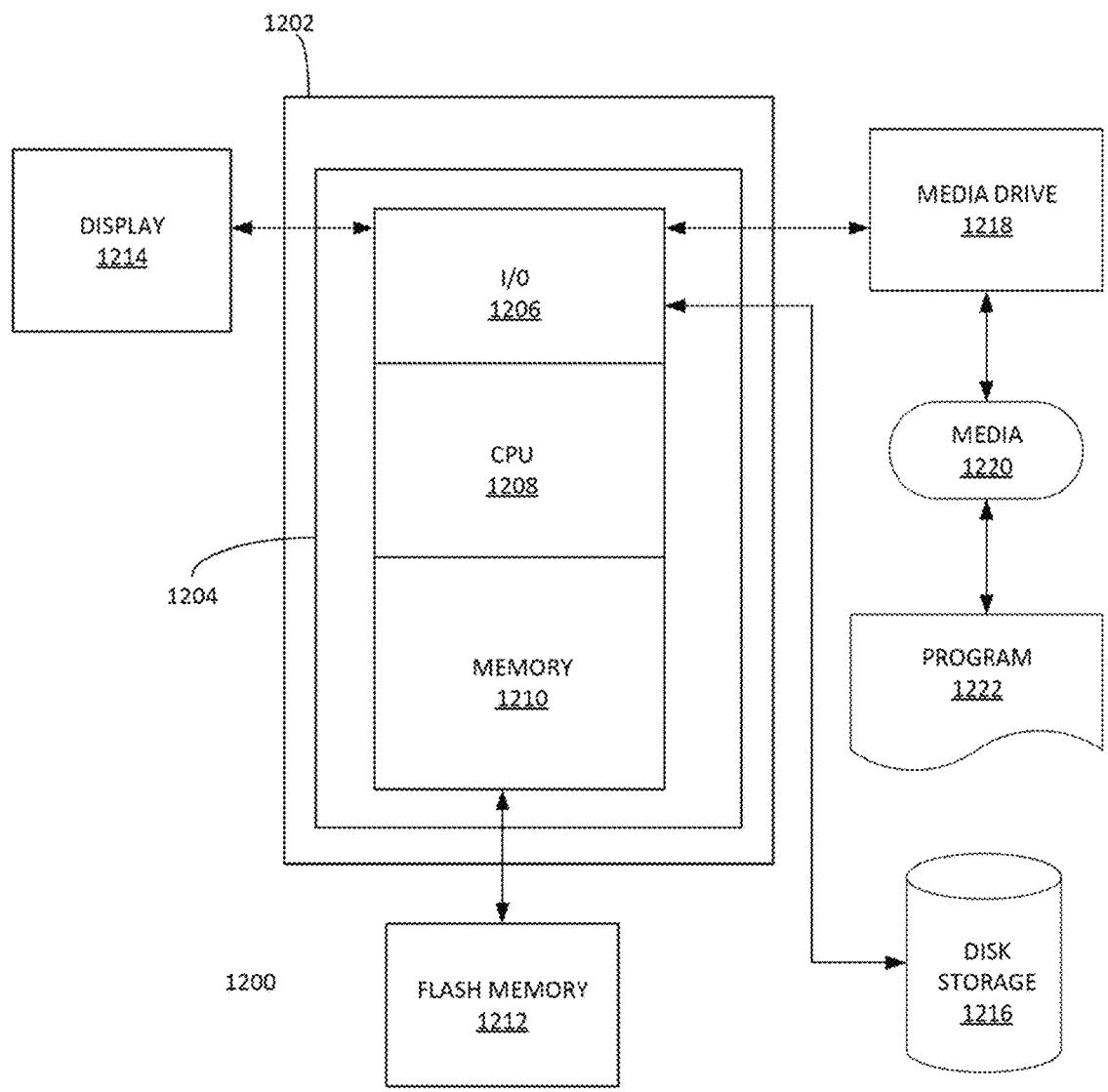
FIG. 12 depicts an exemplary computing system that can be configured to perform any one of the processes provided herein.

FIG. 12 depicts an exemplary computing system 1200 that can be configured to perform any one of the processes provided herein. In this context, computing system 1200 may include, for example, a processor, memory, storage, and I/O devices (e.g., monitor, keyboard, disk drive, Internet connection, etc.). However, computing system 1200 may include circuitry or other specialized hardware for carrying out some car all aspects of the processes. In some operational settings, computing system 1200 may be configured as a system that includes one or more units, each of which is configured to carry out some aspects of the processes either in software, hardware, or some combination thereof.

FIG. 12 depicts computing system 1200 with a number of components that may be used to perform any of the processes described herein. The main system 1202 includes a motherboard 1204 having an I/O section 1208, one or more central processing unit (CPU) 1208, and a memory section 1210, which may have a flash memory card 1212 related to it. The I/O section 1206 can be connected to a display 1214, a keyboard and/or other user input (not shown), a disk storage unit 1216, and a media drive unit 1218. The media drive unit 1218 can read/write a cornputer-readable medium 1220, which can contain programs 1222 and/or data. Computing system 1200 can include a web browser. Moreover; it is noted that computing system 1200 can be configured to include additional systems in order to fulfill various functionalities. Computing system 1200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 13:
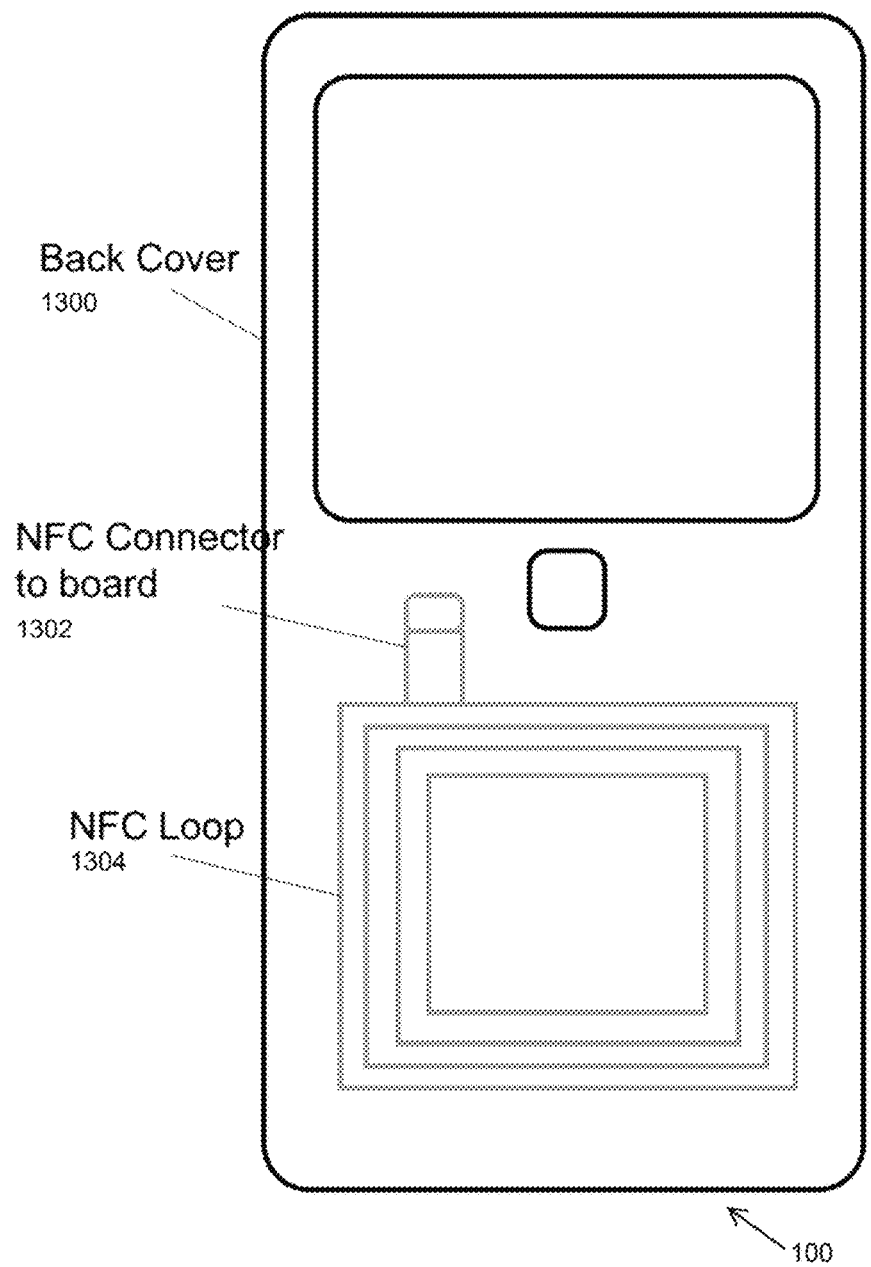
FIG. 13 illustrates a back-side view of PoS integrated transaction mobile device according to some embodiments.

FIG. 13 illustrates a back-side view of PoS integrated transaction mobile device 100, according to some embodiments. PoS integrated transaction mobile device 100 can include back cover 1300. FIG. 13 also illustrates the placement of NFC connector to board 1302 and NFC loop 1304. It is noted that combines in one form factor various components such as various types of payment systems, a barcode scanner, a fingerprint sensor, an RFID system, etc. in a small mobile device form factor.

Figure 14:
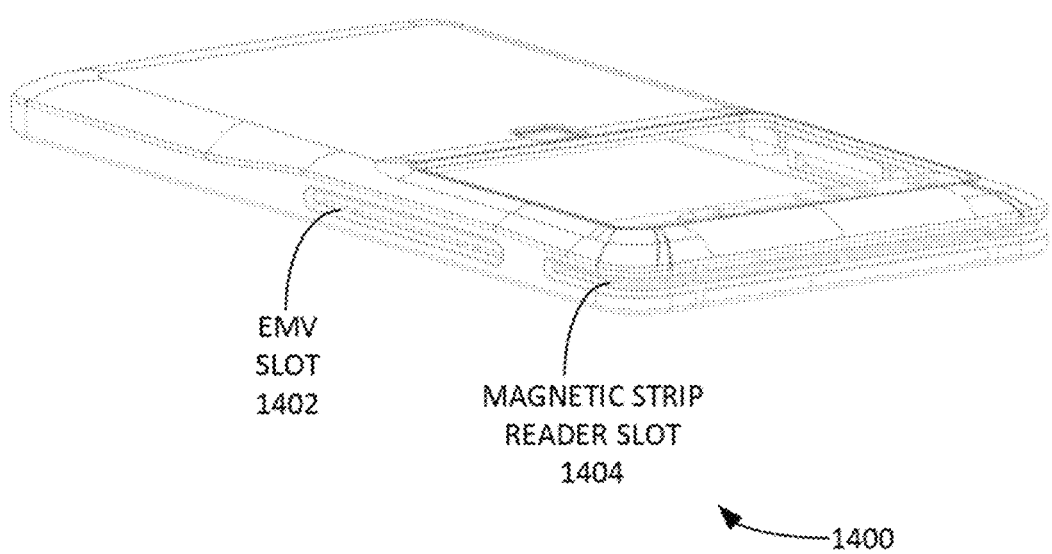
FIG. 14 illustrates an example plastic metal hybrid house of sale-integrated transaction mobile device, according to some embodiments.

FIG. 14 illustrates an example Plastic Metal Hybrid (PMH) 1400 of sale-integrated transaction mobile device, according to some embodiments. PMH can be a type of design that incorporates both metal and plastic into one housing. Such houses can have better mechanical performance than just plastic or just metal housings. In some examples, the front side is generally open and the back side is flat with large cut out in the metal filled in with plastics. In some example, the metal portions can be in four (4) pieces to accommodate antennas. The sale-integrated transaction mobile device can include these features. Additionally, sale-integrated transaction mobile device can include five (5) pieces of metal and a set of large slots 1402 ad 1404 for the MSR swipe card reader and EMV card reader. The opening of the card reader can be slightly larger than the card itself as per PCI regulations. These large openings significantly compromise the structural integrity of the metal housing making it very difficult to control the thickness of the openings if manufactured using conventional means.

The PMH housing in the sale-integrated transaction mobile device can incorporate a payment module. There are alignment features in it to align the MSR and EMV slots 1402 and 1404 of the payment module and the PMH housing. The PMH housing can align the scanner and rear camera in the payment module to the glass on the outside of the sale-integrated transaction mobile device. It can also control the position of the secure touch screen (e.g. a two-point-four (2.4) inch secure touchscreen,; the payment module and the rear housing of the product. The MSR slot 1404 on the top side of the sale-integrated transaction mobile device can split the metal into two halves. The sale-integrated transaction mobile device can have a design in which each half is an antenna. In addition, the EMV slot 1402 can function as an antenna.

A Plastic Metal Hybrid (PMH) can be a type of design that incorporates both metal and plastic into one housing. Such houses have better mechanical performance than just plastic or just metal housings. All the current designs in the market have a smooth rim of metal with cutouts for USB, power and volume buttons, speaker holes and SD/SIM/SAM cards. The front side is generally open and the back-side is flat with large cut out in the metal filled in with plastics. The metal is often in three (3) pieces to accommodate antennas.

The current 'M' design has all these features as ell as, in addition it has four (4) pieces of metal and a large slot(s) for the MSR swipe card reader and EMV card reader. For the former, a credit card can slide from side to side of the device. For the latter, the credit card can be inserted from the side. For both cases, the opening can a bit larger than the credit card itself as per PCI regulations. In addition to the slot openings, there can also be klrounds at the end of slots 1402 and 1404. The present device can include slots with rounded corners.

Accordingly, the PMH housing in the present device can be specifically designed to incorporate a payment module. There are alignment features in it to align the MSR and EMV slots of the payment module and the PMH housing. The PMH housing aligns the scanner and rear camera in payment module to the glass on the outside of the product it also has features to control the position of the two-point-four inches (2.4") secure touch in the payment module and the rear housing of the product. The MSR slot 1404 on the topside of the product can split the relevant metal part into two halves. Each half can be an antenna. In addition, the EMV slot 1402 also functions as an antenna.

Figure 15A:
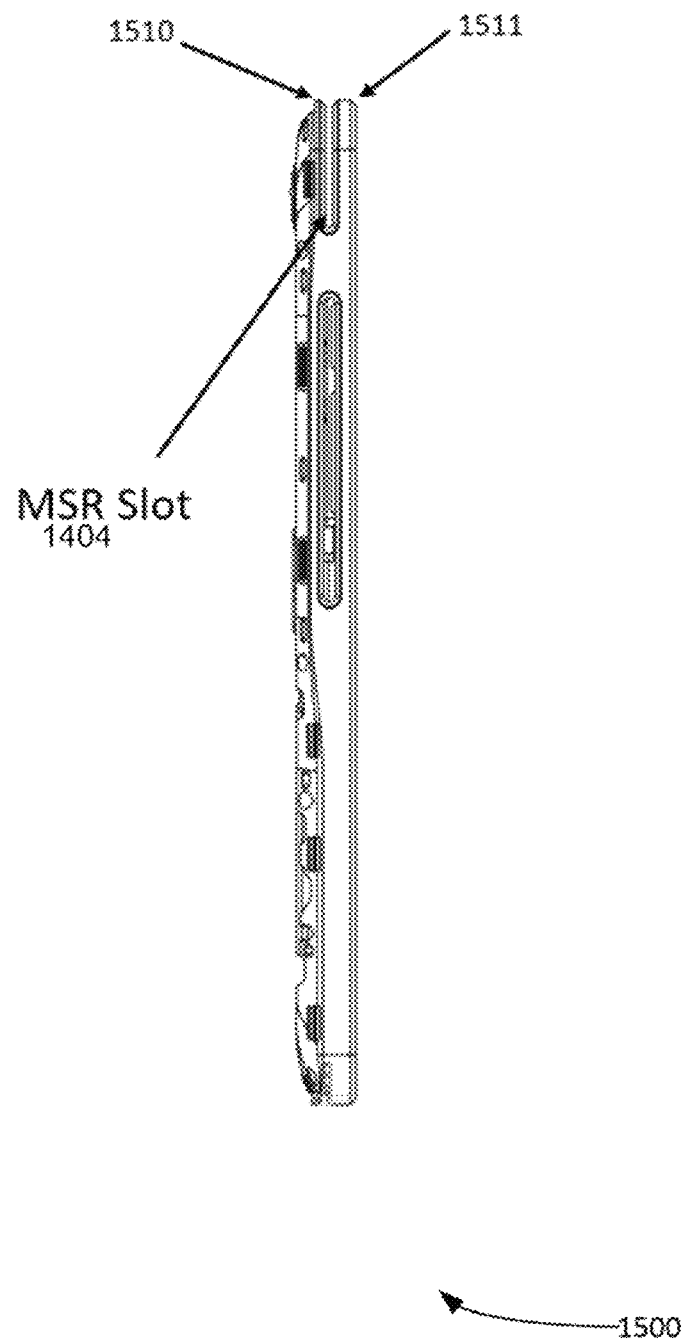
FIGS. 15A-B illustrate various views of antenna breaks in a metal housing portion of a PMH house, according to some embodiments.
Figure 15B:
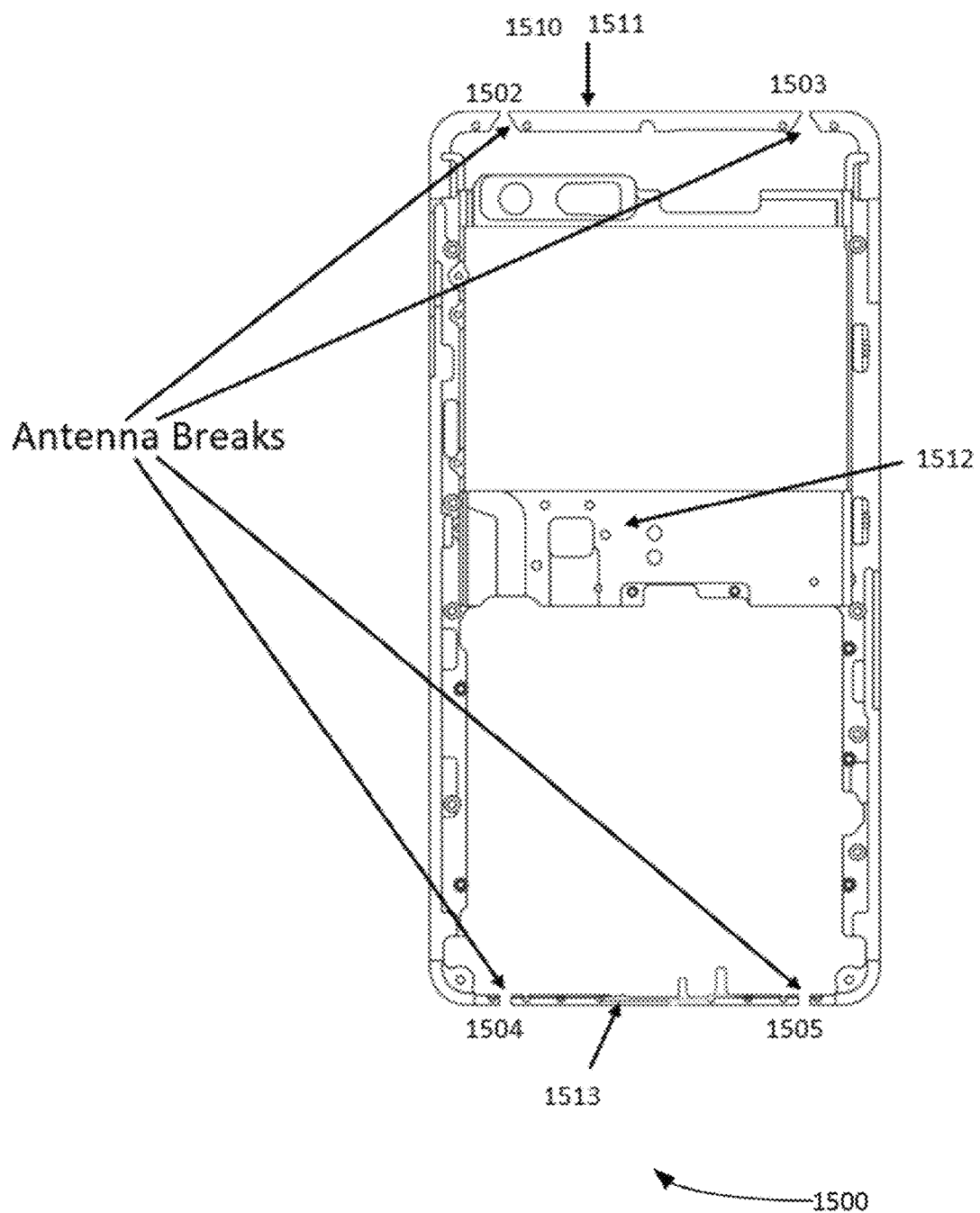

FIGS. 15A-B illustrate various views antenna breaks in a metal housing portion 1500 of PMH house, according to some embodiments. There can be four (4) antenna breaks 1502-1508 in the metal housing. Antenna breaks 1502-1508 can separate metal housing portion 1500 into three (3) parts. In addition, the MSR slot 1404 can break it to two (2) parts (e.g. for a total of four (4) metal parts 1510-1516 as shown in FIG. 15A.

Figure 16A:
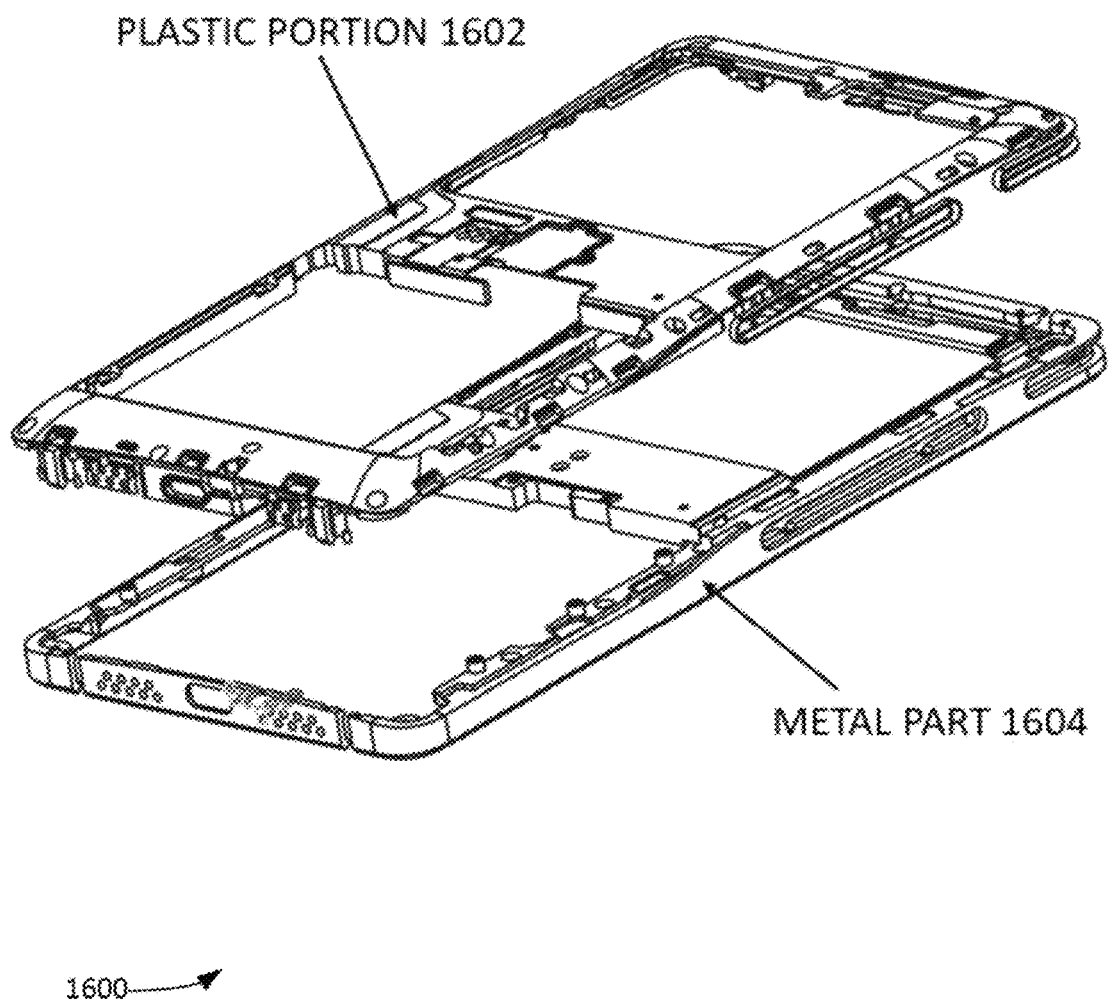
FIGS. 16A-B provide an example PMH house for a sale-Integrated transaction mobile device according to some embodiments.
Figure 16B:
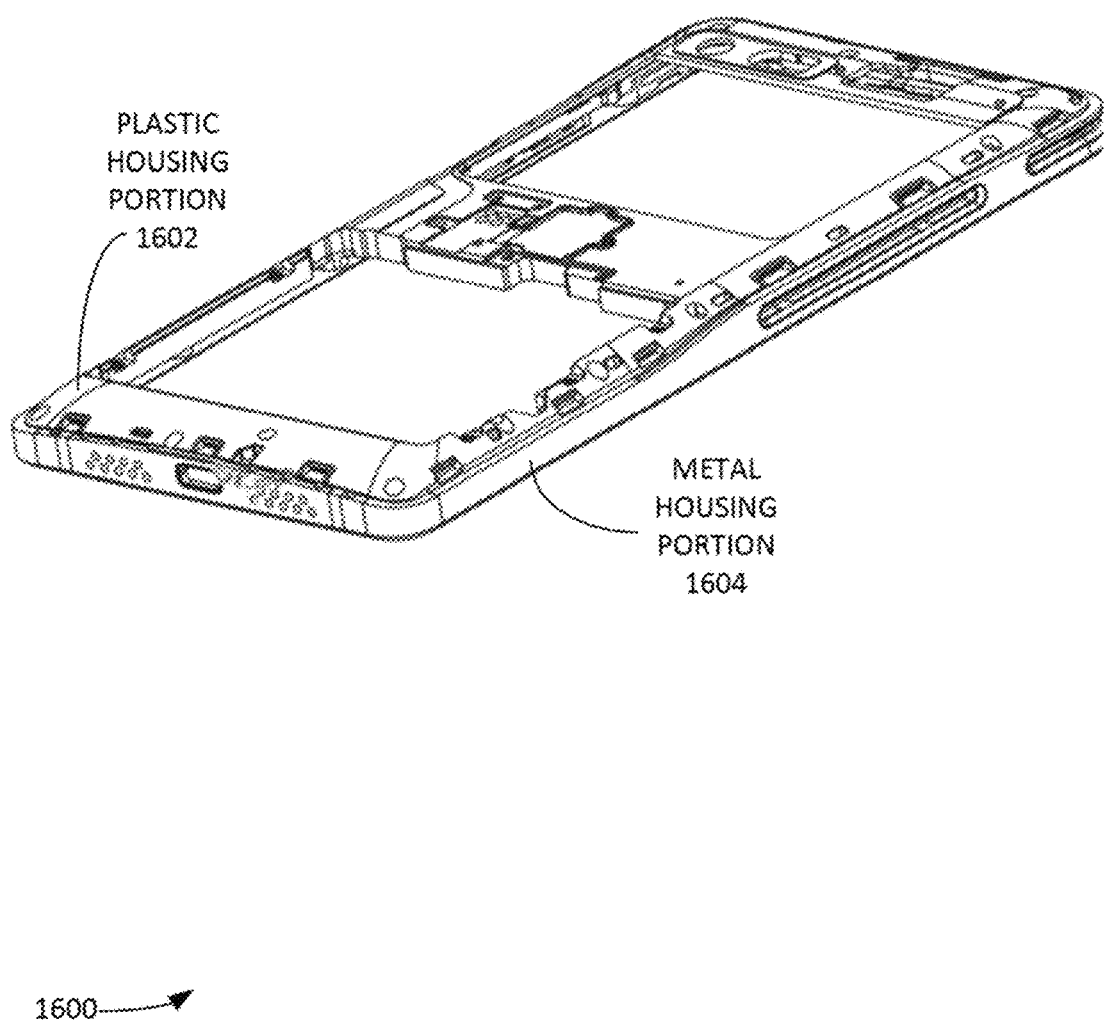

FIGS. 16A-B provide an example PMH house 1600 for a sale-integrated transaction mobile device, according to some embodiments. The plastic housing portion 1602 can be designed to interlock the four (4) metal pieces into one single unit. PMH house 1600 includes multiple locking features. These are designed into both the metal housing portion 1604 and plastic housing portion 1602. As shown, PMH house 1600 includes both positive and negative shapes that fit together like pieces of a jigsaw. The net result is a strong metal frame which is light weight without compromising strength. These features allow component to be mounted to the housing. It is noted that, in some examples, metal housing portion 1604 can be made of Aluminum and/or Aluminum alloy with Magnesium, Silicon, Titanium, etc. The plastic housing portion 1602 can be Poly-Carbonates with thirty to forty percent (30%-40%) glass fiber

CONCLUSION

Although the present embodiments have been described with reference to specific example embodiments, various modifications and changes can be made to these embodiments without departing from the broader spirit and scope of the various embodiments. For example, the various devices, modules etc. described herein can be enabled and operated using hardware circuitry, firmware, software or any combination of hardware, firmware, and software (e.g., embodied in a machine-readable medium).

In addition, it will be appreciated that the various operations processes, and methods disclosed herein can be embodied in a machine-readable medium and/or a machine accessible medium compatible with a data processing system (e.g., a computer system), and can be performed in any order (e.g., including using means for achieving the various operation). Accordingly, the specification and drawings are to be regarded in an illustrative rather than a restrictive sense. In some embodiments, the machine-readable medium can be a non-transitory form of machine-readable medium.

What is claimed is:

1. A sale-integrated transaction mobile device comprising:
a set of components of a mobile device system;
a set of components of a payment device system that is a separate module from the set of components of the mobile device system, wherein the set of components of the mobile device system comprises a mobile-device processor, a secure payment processor, a memory, an EMV (Europay, MasterCard, and Visa) card reader system, a Magnetic stripe reader (MSR);
a plastic housing upper portion of the mobile device system;
a metal housing bottom portion of the mobile device system; and
wherein the plastic housing upper portion of the mobile device system is connected with the bottom metal housing portion to house the components of the mobile device system.

2. The sale-integrated transaction mobile device of claim 1, wherein the set of components of the mobile device system comprises a glass film film (GFF) touch sensor, and wherein the plastic housing upper portion comprises an aperture configured to provide a user touch access to the GFF touch sensor.

3. The sale-integrated transaction mobile device of claim 1, wherein the MSR card slot is equal in length to a side of the connected plastic housing portion and the metal housing portion.

4. The sale-integrated transaction mobile device of claim 3, wherein the MSR slot is on the topside of the sale-integrated transaction mobile device and splits the top part of the metal housing portion into two halves, and wherein one of the two halves of the top part of the metal housing portion comprises a portion of an antenna system of the sale-integrated transaction mobile device.

5. The sale-integrated transaction mobile device of claim 1, wherein the payment module portion of the mobile device system is connected with the metal housing portion provides an EMV card slot and MSR Slot.

6. The sale-integrated transaction mobile device of claim 1, wherein the metal housing portion part of the EMV slot function as an antenna for the sale-integrated transaction mobile device.

7. The sale-integrated transaction mobile device of claim 6, wherein a set of dimensions of the EMV slot are configured to fit insertion of an international standard sized credit card.

8. The sale-integrated transaction mobile device of claim 1, wherein the metal housing portion comprises four antenna breaks in the metal housing portion.

9. The sale-integrated transaction mobile device of claim 8, wherein the four antenna breaks in the metal housing portion separate the metal housing portion into three sections.

10. The sale-integrated transaction mobile device of claim 9, wherein the set of components of the mobile device system comprises an NFC (Near field communication) reader system.

11. The sale-integrated transaction mobile device of claim 9, wherein a separate secure payment module is integrated into a smartphone for factor design with features in the metal housing portion that are configured to:
line up the MSR slot in the payment module with the MSR slot in the metal hosing such that only one credit card can be inserted into the MSR slot;
line up the EMV slot in the payment module with the EMV slot in the metal housing such that only one credit card may be inserted into the slot; and
integrate a display screen of the payment module with the metal housing to provide a seamless second secure display which appears like a part of overall device.

12. The sale-integrated transaction mobile device of claim 11, wherein the large slots are incorporated in the metal housing to form the MSR slot and the EMV slot in order to ensure strength, manufacturability and reliability of the slots intricate design features are made in the metal and plastic portions of the metal housing.

13. The sale-integrated transaction mobile device of claim 12, wherein the antenna is configured on the top side of the metal housing with an MSR slot.

14. A sale-integrated transaction mobile device comprising:
a set of components of a mobile device system;
a set of components of a payment device system that is a separate module from the set of components of the mobile device system, wherein the set of components of the mobile device system comprises a mobile-device processor, a secure payment processor, a memory, an EMV (Europay, MasterCard, and Visa) card reader system, a Magnetic stripe reader (MSR);
a plastic housing upper portion of the mobile device system;
a metal housing bottom portion of the mobile device system, wherein the metal housing portion comprises four antenna breaks in the metal housing portion; and
wherein the plastic housing upper portion of the mobile device system is connected with the bottom metal housing portion to house the components of the mobile device system.

15. A sale-integrated transaction mobile device comprising:
a set of components of a mobile device system;

a set of components of a payment device system that is a separate module from the set of components of the mobile device system;

a plastic housing upper portion of the mobile device system;

a metal housing bottom portion of the mobile device system, wherein the metal housing portion comprises four antenna breaks in the metal housing portion, and wherein the four antenna breaks in the metal housing portion separate the metal housing portion into three sections; and wherein the plastic housing upper portion of the mobile device system is connected with the bottom metal housing portion to house the components of the mobile device system.

16. The sale-integrated transaction mobile device of claim 15, wherein the set of components of the mobile device system comprises a mobile-device processor, a secure payment processor, a memory, an EMV (Europay, MasterCard, and Visa) card reader system, a Magnetic stripe reader (MSR).

* * * * *